(12) United States Patent
Wei et al.

(10) Patent No.: US 11,789,290 B2
(45) Date of Patent: Oct. 17, 2023

(54) METHOD FOR PREPARING DOUBLE-SIDED COMPOSITE THINNING ZOOM CONCAVE LENS

(71) Applicants: Bingsong Wei, Jiangsu (CN); Hao Deng, Jiangsu (CN)

(72) Inventors: Bingsong Wei, Jiangsu (CN); Hao Deng, Jiangsu (CN)

( * ) Notice: Subject to any disclaimer, the term of this patent is extended or adjusted under 35 U.S.C. 154(b) by 284 days.

(21) Appl. No.: 17/372,420

(22) Filed: Jul. 10, 2021

(65) Prior Publication Data

US 2021/0333573 A1 Oct. 28, 2021

(30) Foreign Application Priority Data

Nov. 23, 2020 (CN) .......................... 202011321238.6

(51) Int. Cl.
*G02C 7/02* (2006.01)
(52) U.S. Cl.
CPC ......... *G02C 7/028* (2013.01); *G02C 2202/24* (2013.01)

(58) Field of Classification Search
CPC .... G02C 7/028; G02C 2202/24; G02C 7/081; G02C 7/024
USPC ..................................................... 351/41, 178
See application file for complete search history.

(56) References Cited

U.S. PATENT DOCUMENTS 6,142,624 A  * 11/2000 Morris ..................... G02C 7/02
                                                       351/158
7,703,919 B2 *  4/2010 Thompson ............. G16H 10/60
                                                       351/205

* cited by examiner

*Primary Examiner* — Tuyen Tra

(57) ABSTRACT

A method for preparing the double-sided composite thinning zoom concave lens, includes steps of: S1: establishing the a front surface mathematical model and a back surface mathematical model in an optical software; S2: establishing an evaluation function comprising an optimized value of astigmatism and an edge thickness of the lens; and S3: inputting a structural parameters of the lens blank and the prescription power, optimizing one by one using the least square method according to the evaluation function to obtain data of a front surface and a rear surface of the lens.

10 Claims, 3 Drawing Sheets

METHOD FOR PREPARING DOUBLE-SIDED COMPOSITE THINNING ZOOM CONCAVE LENS

CROSS REFERENCE OF RELATED APPLICATION

The present application claims priority under 35 U.S.C. 119(a-d) to CN 202011321238.6, filed Nov. 23, 2020.

BACKGROUND OF THE PRESENT INVENTION

Field of Invention

The invention relates to the technical field of optical lens design, and more particularly to a method for preparing a double-sided composite thinning zoom concave lens.

Description of Related Arts

With the improvement of living standards, people have put forward higher requirements for the comfort of concave lenses. In the conventional arts, single vision lenses for myopia always utilizes an infinite object point with an object distance greater than or equal to 5 meters to calculate the refractive power of the lens to meet the prescription for optometry. However, in the actual use of the lens, the objects that the human eye observes through the lens are not only in the distance, but also in nearby areas. If the lens is capable of changing the diopter according to different object points (zooming) to reduce the degree of adjustment of the eyes to a certain extent, the eyes will be more comfortable while using. In addition, since the main aberration of the lens is astigmatism, the traditional spherical surface is capable of effectively optimizing the astigmatism only when a certain base curve is satisfied. However, the thickness and weight of the lens is contrary to comfort requirements, especially for users with high myopia.

SUMMARY OF THE PRESENT INVENTION

In order to solve the above technical problems in the conventional arts, an object of the present invention is to provide a method for preparing a double-sided composite thinning zoom concave lens.

A method for preparing the double-sided composite thinning zoom concave lens, comprises steps of:

S1: establishing the a front surface mathematical model and a back surface mathematical model in an optical software, which is as shown in Equation 1 and Equation 2:

$$f(x) = \frac{k_1 x^2}{1 + (1 - p_1 k_1^2 x^2)^{\frac{1}{2}}} \quad \text{Equation (1)}$$

$$g(x) = \frac{k_2 x^2}{1 + (1 - p_2 k_2^2 x^2)^{\frac{1}{2}}} + Ax^4 \quad \text{Equation (2)}$$

wherein $k_1$ is a paraxial curvature of the front surface, $k_2$ is a paraxial curvature of the rear surface, $p_1$ is a front surface aspheric coefficient, $p_2$ is a rear surface aspheric coefficient, $A$ is a higher order coefficient, and $x$ is a radial radius;

S2: establishing an evaluation function comprising an optimized value of astigmatism and an edge thickness of the lens; and S3: inputting a structural parameters of the lens blank and the prescription power to calculate $k_1$, $k_2$, optimizing one by one using the least square method according to the evaluation function to obtain $p_1$, $p_2$ and $A$.

Preferably, in the step of S2, the evaluation function comprises m objective functions $f_1, f_2 \ldots f_m$.

Preferably, in the step of S2, the evaluation function is $$\emptyset(x) = \Sigma_{k=1}^m (f_k(x))^2 \quad \text{(Equation 3)}.$$

Preferably, m=5, $f_1$ is an astigmatism optimization within a lens center radius of 10 mm, and a target value is 0; $f_2$ is an astigmatism optimization within a lens center radius of 20 mm, and the target value is 0; $f_3$ is an astigmatism optimization within a lens center radius of 25 mm, and a target value is 0; $f_4$ is a power of a spherical lens within a radius of 5 mm, and a target value is consistent with a prescription power; $f_5$ is an edge thickness of the lens, and a target value is a value set by a user.

Preferably, the method further comprises a step S4: processing a substrate according to structural parameters $k_1$, $k_2$, $p_1$, $p_2$ and A of a lens blank.

Preferably, the method further comprises a step S5: hardening and filming the substrate.

A double-sided composite thinning zoom concave lens, comprising the substrate processed according to the method mentioned above is further provided.

The double-sided composite thinning zoom concave lens, as recited in claim 8, wherein a surface of the substrate is coated with infrared optical coating.

Compared with the conventional arts, the preparation method of the double-sided composite thinning zoom concave lens of the present invention has beneficial effects as follows.

1. Compared with the spherical surface, an edge thickness of the lens is reduced by 20% to 30% depending on the brightness;

2. A zoom range from the optical center to the edge is ±4.00 D, and the lens can be zoomed according to the prescription of optometry between a lens diameter at a range of 10-40 mm;

3. The astigmatism is basically eliminated within a lens diameter of 50 mm.

DETAILED DESCRIPTION OF THE PREFERRED EMBODIMENT

In the following, the double-sided composite thinning zoom myopia lens of the present invention will be further described in conjunction with specific embodiments to help those skilled in the art have a more complete, accurate and in-depth understanding of the technical solution of the present invention.

Embodiment 1

A method for preparing a double-sided composite thinning zoom concave lens, comprising steps of:

S1: establishing the a front surface mathematical model and a back surface mathematical model in an optical software, which is as shown in Equation 1 and Equation 2:

$$f(x) = \frac{k_1 x^2}{1 + (1 - p_1 k_1^2 x^2)^{\frac{1}{2}}} \quad \text{Equation (1)}$$

$$g(x) = \frac{k_2 x^2}{1 + (1 - p_2 k_2^2 x^2)^{\frac{1}{2}}} + Ax^4 \quad \text{Equation (2)}$$

wherein $k_1$ is a paraxial curvature of the front surface, $k_2$ is a paraxial curvature of the rear surface, $p_1$ is a front surface aspheric coefficient, $p_2$ is a rear surface aspheric coefficient, A is a higher order coefficient, and x is a radial radius;

S2: establishing an evaluation function of: $\emptyset(x) = \Sigma_{k=1}^{m} (f_k(x))^2$;

setting m=5, wherein $f_1$ is an astigmatism optimization within a lens center radius of 10 mm, and a target value is 0; $f_2$ is an astigmatism optimization within a lens center radius of 20 mm, and the target value is 0; $f_3$ is an astigmatism optimization within a lens center radius of 25 mm, and a target value is 0; $f_4$ is a power of a spherical lens within a radius of 5 mm, and a target value is consistent with a prescription power; $f_5$ is an edge thickness of the lens, and a target value is a value set by a user;

S3: inputting a structural parameters of the lens blank including a lens diameter of 75 mm, a refractive index of 1.598, a base curve of 0.8 D, a center thickness of 1.2 mm and a the prescription power of −6.00 D to calculate $k_1$=1.0033 D, $k_2$=11.037 D. Using the linear approximation of $\emptyset(x)$, by the least square method to obtain the optimal solutions of $p_1$, $p_2$ and A according to the automatic optimization procedure, p1, p2 and A are obtained. The results are shown in Table 1.

TABLE 1

| | |
|---|---|
| Lens refractive index | 1.598 |
| Luminosity | −6.00D |
| diameter | 75 mm |
| Front surface curvature k1 | 1.0033D |
| Back surface curvature k2 | 11.037D |
| Front surface aspheric coefficient p1 | 7.523204 |
| Back surface aspheric coefficient p2 | −6.785426 |
| Rear surface high-order coefficient A | 5.4128724E−09 |
| Center thickness | 1.2 mm |
| Edge thickness | 6.6 mm |

Then, the substrate is processed according to the parameters in Table 1.

Figure 1A:
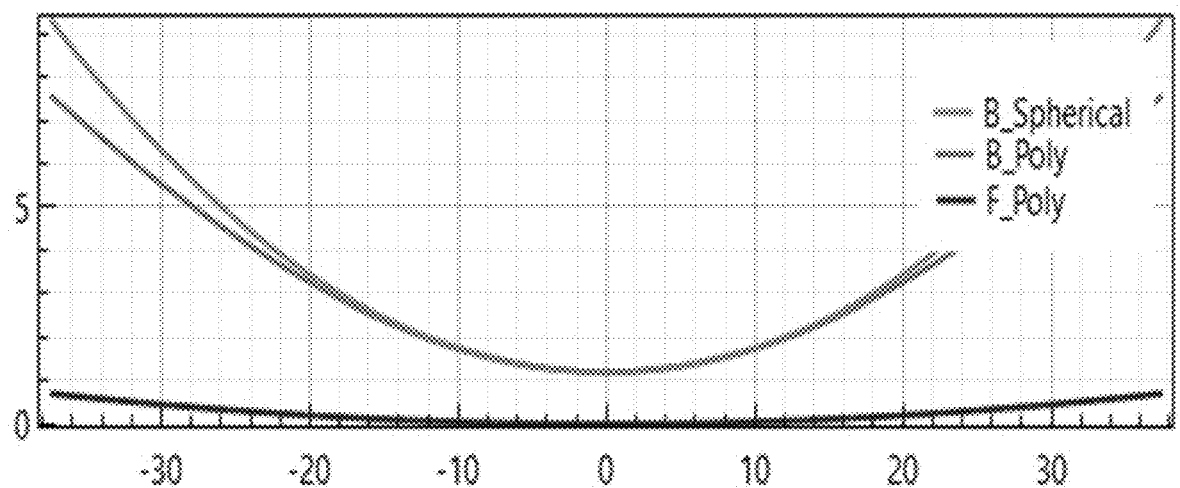
FIG. 1*a* is a cross-sectional view of a concave lens according to an Embodiment 1 of the present invention.

The cross-sectional view of the lens obtained is shown in FIG. 1a, wherein:

X axis: a diameter of a cross section of the lens, an origin is the geometric center of the lens Y axis: a vector height of the cross section of the lens;

wherein from bottom to top, they are: curve F_Poly, curve B_Poly and curve B_Spherical;

wherein the curve F_Poly represents a sagittal height of the front surface of the lens, the curve B_Poly represents a sagittal height of the rear surface of the lens, and the curve B_Spherical represents a sagittal height of the traditional spherical lens with the same luminosity.

Figure 1B:
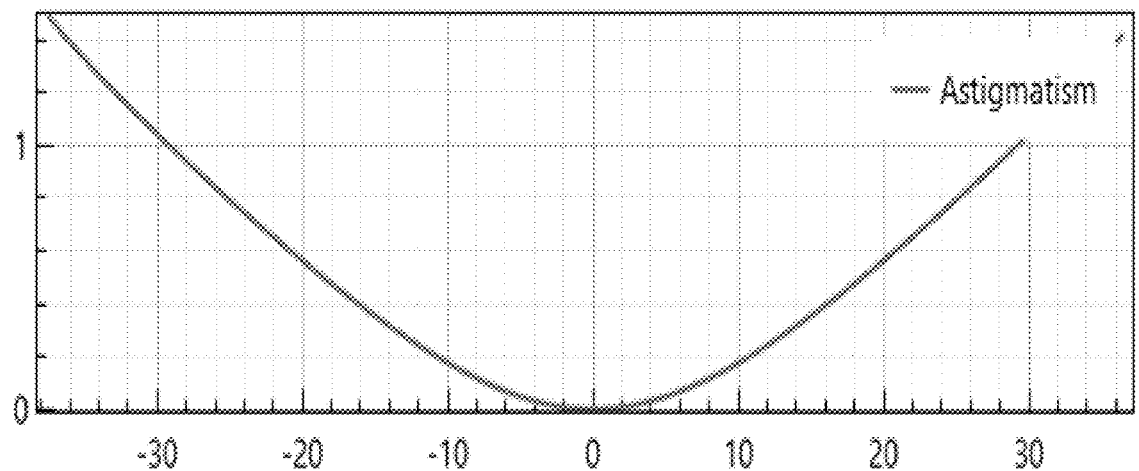
FIG. 1*b* is an astigmatism diagram of the concave lens according to the Embodiment 1 of the present invention.
Figure 1C:
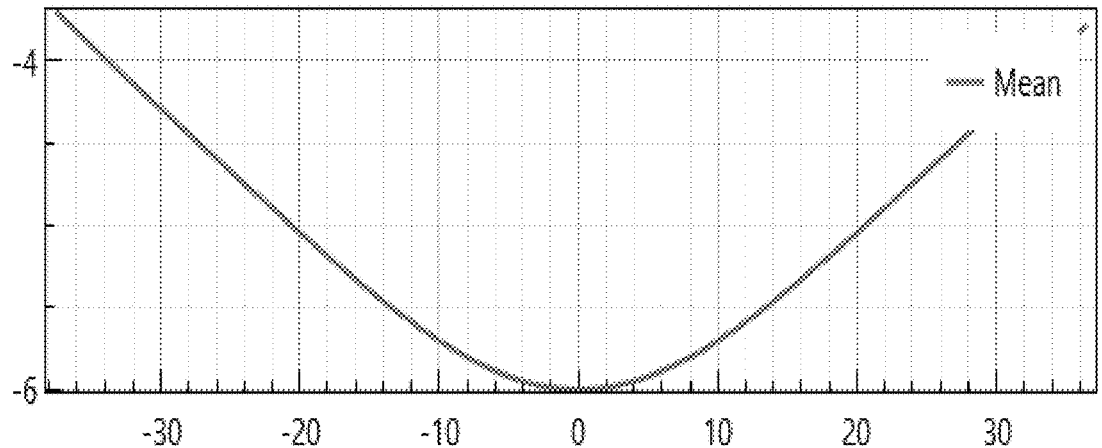
FIG. 1*c* is a power diagram of the concave lens according to the Embodiment 1 of the present invention.

An astigmatism diagram of the lens obtained is shown in FIG. 1b, wherein the X axis: the diameter of the lens cross section, the origin is the geometric center of the lens; the Y axis: the lens astigmatism. The obtained power diagram is shown in FIG. 1c, the cross-sectional diameter of the lens, the origin is the geometric center of the lens; Y axis: the power of the lens.

Referring to FIG. 1 of the drawings, according to a preferred embodiment of the present invention is illustrated, wherein/comprising

Embodiment 2

A method for preparing a double-sided composite thinning zoom concave lens, comprising steps of:

S1: establishing the a front surface mathematical model and a back surface mathematical model in an optical software, which is as shown in Equation 1 and Equation 2:

$$f(x) = \frac{k_1 x^2}{1 + (1 - p_1 k_1^2 x^2)^{\frac{1}{2}}} \quad \text{Equation (1)}$$

$$g(x) = \frac{k_2 x^2}{1 + (1 - p_2 k_2^2 x^2)^{\frac{1}{2}}} + Ax^4 \quad \text{Equation (2)}$$

wherein $k_1$ is a paraxial curvature of the front surface, $k_2$ is a paraxial curvature of the rear surface, $p_1$ is a front surface aspheric coefficient, $p_2$ is a rear surface aspheric coefficient, A is a higher order coefficient, and x is a radial radius;

S2: establishing an evaluation function of: $\emptyset(x) = \Sigma_{k=1}^{m} (f_k(x))^2$;

setting m=5, wherein $f_1$ is an astigmatism optimization within a lens center radius of 10 mm, and a target value is 0; $f_2$ is an astigmatism optimization within a lens center radius of 20 mm, and the target value is 0; $f_3$ is an astigmatism optimization within a lens center radius of 25 mm, and a target value is 0; $f_4$ is a power of a spherical lens within a radius of 5 mm, and a target value is consistent with a prescription power; $f_5$ is an edge thickness of the lens, and a target value is a value set by a user;

S3: inputting a structural parameters of the lens blank including a lens diameter of 70 mm, a refractive index of 1.598, a base curve of 0.5 D, a center thickness of 1.2 mm and a the prescription power of −9.00 D to calculate $k_1$=0.8361 D, $k_2$=15.8866 D. Using the linear approximation of $\emptyset(x)$, by the least square method to obtain the optimal solutions of $p_1$, $p_2$ and A according to the automatic optimization procedure, p1, p2 and A are obtained. The results are shown in Table 2.

TABLE 2

| | |
|---|---|
| Lens refractive index | 1.598 |
| Luminosity | −9.00D |
| diameter | 70 mm |
| Front surface curvature k1 | 0.8361D |
| Back surface curvature k2 | 15.8866D |
| Front surface aspheric coefficient p1 | −0.5116 |
| Back surface aspheric coefficient p2 | −3.06148 |
| Rear surface high-order coefficient A | 1.740166E−08 |
| Center thickness | 1.2 mm |
| Edge thickness | 6.8 mm |

Then, the substrate is processed according to the parameters in Table 2.

Figure 2A:
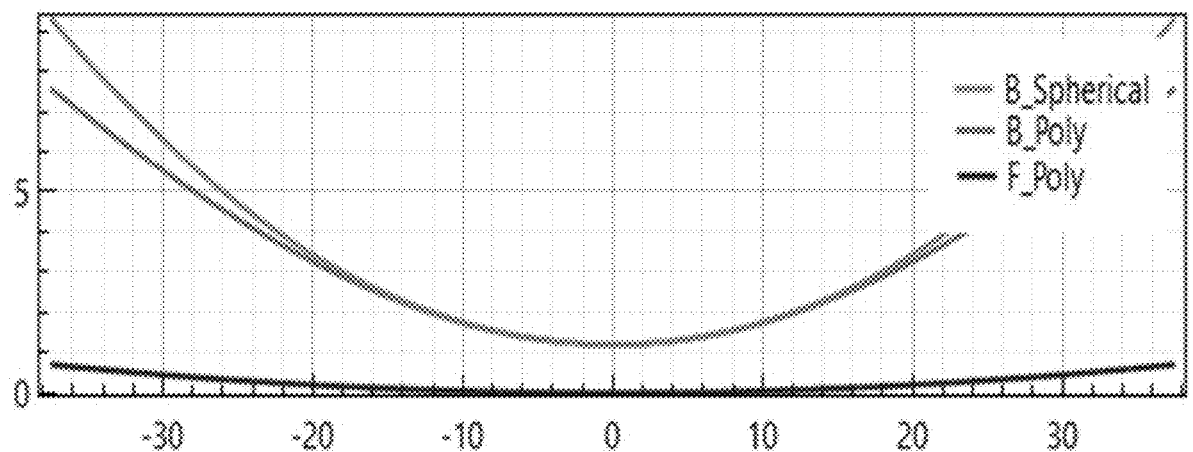
FIG. 2*a* is a cross-sectional view of the concave lens according to the Embodiment 2 of the present invention.

The cross-sectional view of the lens obtained is shown in FIG. 2a, wherein:

X axis: a diameter of a cross section of the lens, an origin is the geometric center of the lens Y axis: a vector height of the cross section of the lens;

wherein from bottom to top, they are: curve F_Poly, curve B_Poly and curve B_Spherical;

wherein the curve F_Poly represents a sagittal height of the front surface of the lens, the curve B_Poly represents a sagittal height of the rear surface of the lens, and the curve B_Spherical represents a sagittal height of the traditional spherical lens with the same luminosity.

Figure 2B:
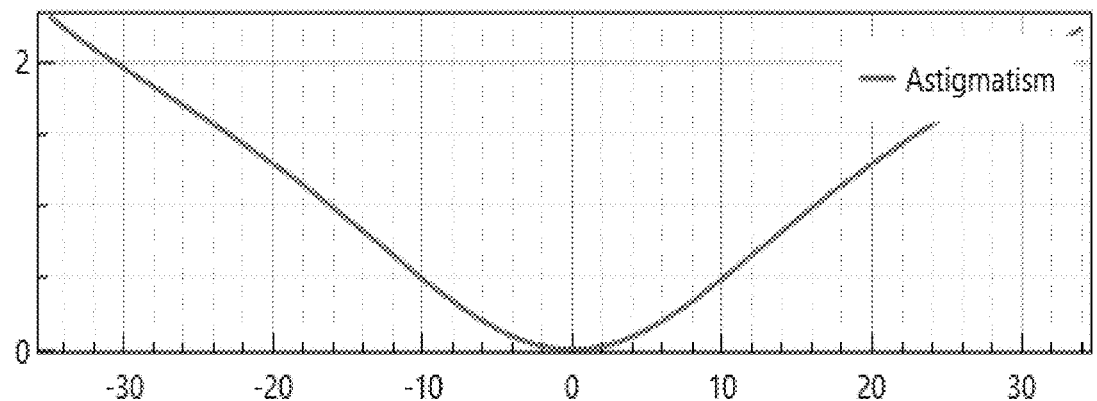
FIG. 2*b* is an astigmatism diagram of the concave lens according to the Embodiment 2 of the present invention.
Figure 2C:
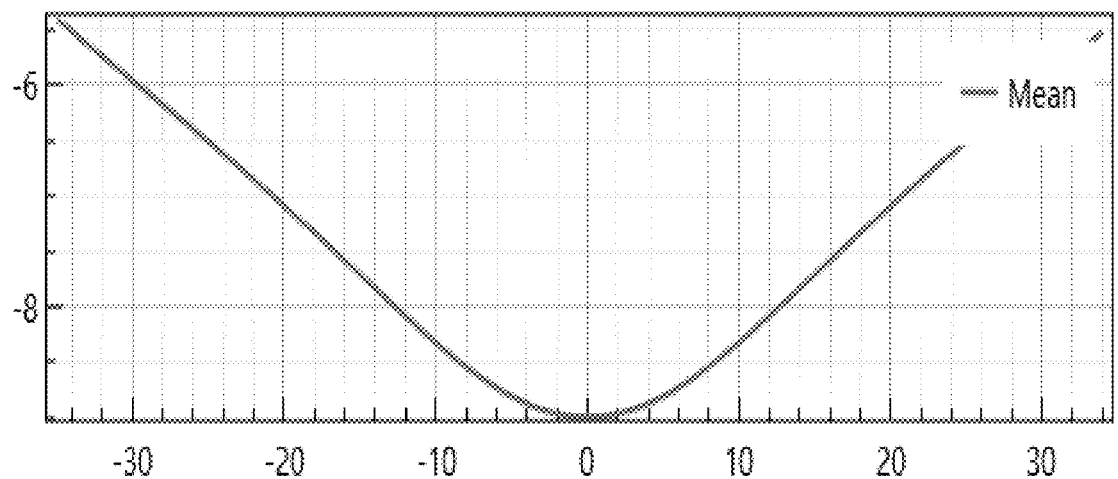
FIG. 2*c* is a power diagram of the concave lens according to the Embodiment 2 of the present invention.

An astigmatism diagram of the lens obtained is shown in FIG. 2b, wherein the X axis: the diameter of the lens cross section, the origin is the geometric center of the lens; the Y axis: the lens astigmatism. The obtained power diagram is shown in FIG. 2c, the cross-sectional diameter of the lens, the origin is the geometric center of the lens; Y axis: the power of the lens.

Embodiment 3

A method for preparing a double-sided composite thinning zoom concave lens, comprising steps of:

S1: establishing the a front surface mathematical model and a back surface mathematical model in an optical software, which is as shown in Equation 1 and Equation 2:

$$f(x) = \frac{k_1 x^2}{1 + (1 - p_1 k_1^2 x^2)^{\frac{1}{2}}} \quad \text{Equation (1)}$$

$$g(x) = \frac{k_2 x^2}{1 + (1 - p_2 k_2^2 x^2)^{\frac{1}{2}}} + Ax^4 \quad \text{Equation (2)}$$

wherein $k_1$ is a paraxial curvature of the front surface, $k_2$ is a paraxial curvature of the rear surface, $p_1$ is a front surface aspheric coefficient, $p_2$ is a rear surface aspheric coefficient, A is a higher order coefficient, and x is a radial radius;

S2: establishing an evaluation function of: $\emptyset(x) = \sum_{k=1}^{m} (f_k(x))^2$;

setting m=5, wherein $f_1$ is an astigmatism optimization within a lens center radius of 10 mm, and a target value is 0; $f_2$ is an astigmatism optimization within a lens center radius of 20 mm, and the target value is 0; $f_3$ is an astigmatism optimization within a lens center radius of 25 mm, and a target value is 0; $f_4$ is a power of a spherical lens within a radius of 5 mm, and a target value is consistent with a prescription power; $f_5$ is an edge thickness of the lens, and a target value is a value set by a user;

S3: inputting a structural parameters of the lens blank including a lens diameter of 75 mm, a refractive index of 1.67, a base curve of 0.8 D, a center thickness of 1.2 mm and a the prescription power of −6.00 D to calculate $k_1$=1.194 D, $k_2$=10.149 D. Using the linear approximation of Ø(x), by the least square method to obtain the optimal solutions of $p_1$, $p_2$ and A according to the automatic optimization procedure, p1, p2 and A are obtained. The results are shown in Table 3.

TABLE 3

| | |
|---|---|
| Lens refractive index | 1.67 |
| Luminosity | −6.00D |
| diameter | 75 mm |
| Front surface curvature k1 | 1.194D |
| Back surface curvature k2 | 10.194D |
| Front surface aspheric coefficient p1 | 1.26810 |
| Back surface aspheric coefficient p2 | −7.929626 |
| Rear surface high-order coefficient A | −1.518197E−08 |
| Center thickness | 1.2 mm |
| Edge thickness | 6.15 mm |

Then, the substrate is processed according to the parameters in Table 3.

Figure 3A:
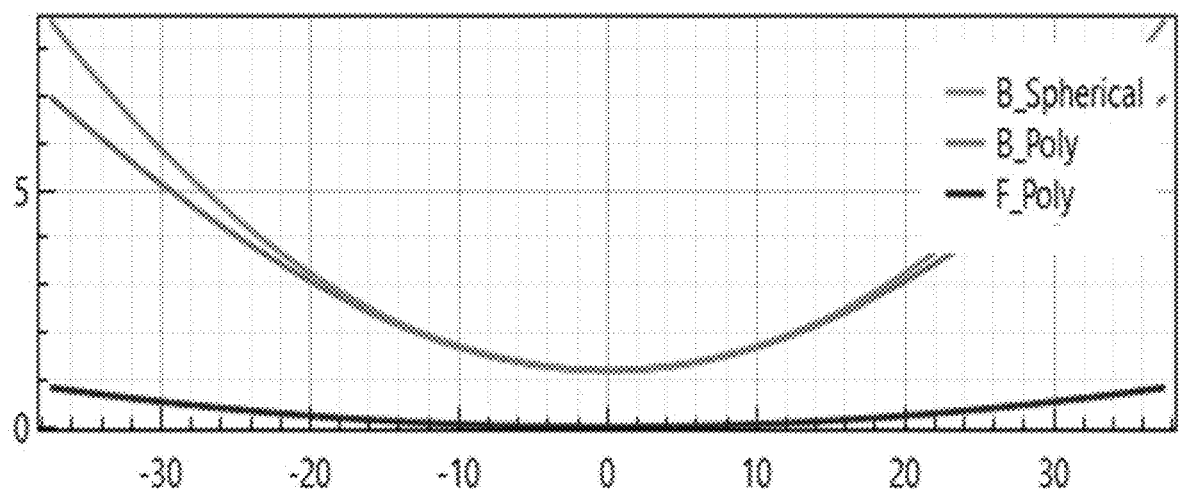
FIG. 3*a* is a cross-sectional view of the concave lens according to the Embodiment 3 of the present invention.

The cross-sectional view of the lens obtained is shown in FIG. 3a, wherein:

X axis: a diameter of a cross section of the lens, an origin is the geometric center of the lens Y axis: a vector height of the cross section of the lens;

wherein from bottom to top, they are: curve F_Poly, curve B_Poly and curve B_Spherical;

wherein the curve F_Poly represents a sagittal height of the front surface of the lens, the curve B_Poly represents a sagittal height of the rear surface of the lens, and the curve B_Spherical represents a sagittal height of the traditional spherical lens with the same luminosity.

Figure 3B:
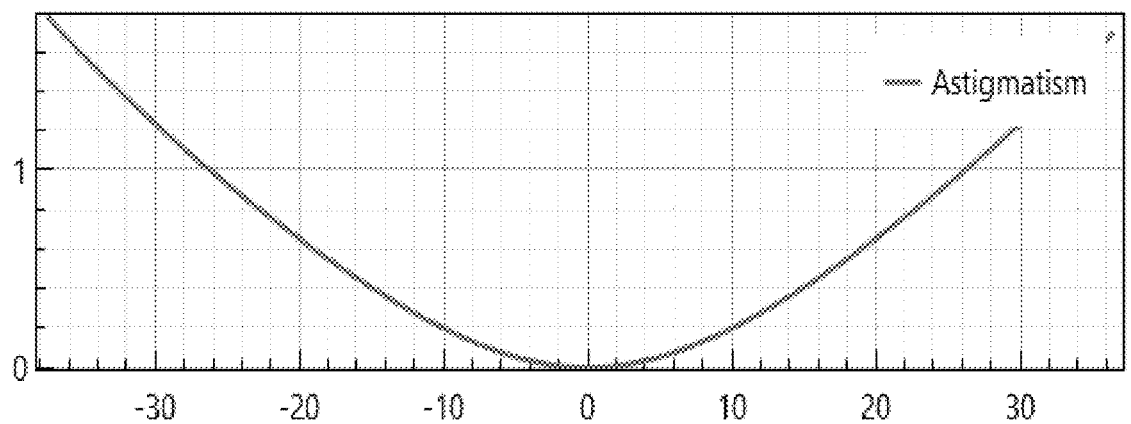
FIG. 3*b* is an astigmatism diagram of the concave lens according to the Embodiment 3 of the present invention.
Figure 3C:
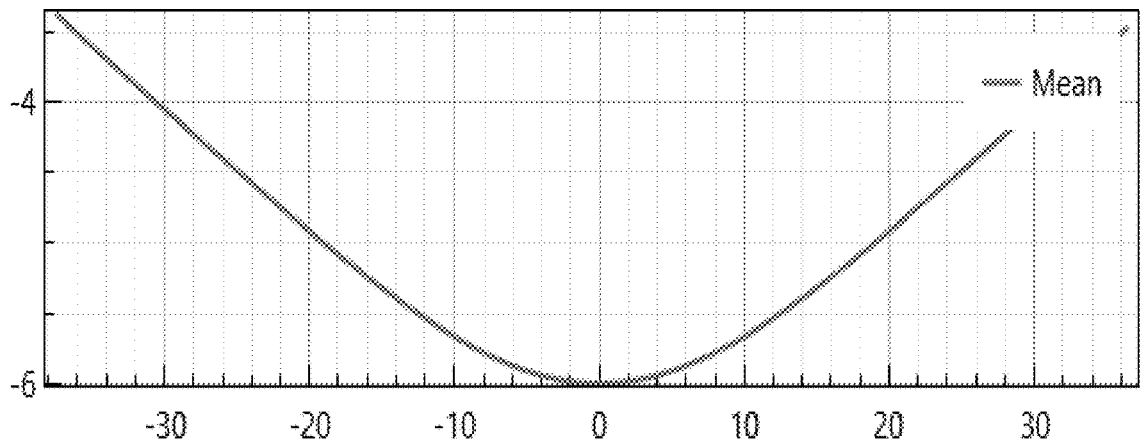
FIG. 3c is a power diagram of the concave lens according to the Embodiment 3 of the present invention.

An astigmatism diagram of the lens obtained is shown in FIG. 3b, wherein the X axis: the diameter of the lens cross section, the origin is the geometric center of the lens; the Y axis: the lens astigmatism. The obtained power diagram is shown in FIG. 3c, the cross-sectional diameter of the lens, the origin is the geometric center of the lens; Y axis: the power of the lens.

Referring to FIG. 1 of the drawings, according to a preferred embodiment of the present invention is illustrated, wherein/comprising One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for preparing a double-sided composite thinning zoom concave lens, comprising steps of:
   S1: establishing the a front surface mathematical model and a back surface mathematical model in an optical software, which is as shown in Equation 1 and Equation 2:

$$f(x) = \frac{k_1 x^2}{1 + (1 - p_1 k_1^2 x^2)^{\frac{1}{2}}} \quad \text{Equation (1)}$$

-continued $$g(x) = \frac{k_2 x^2}{1 + (1 - p_2 k_2^2 x^2)^{\frac{1}{2}}} + Ax^4 \quad \text{Equation (2)}$$

wherein $k_1$ is a paraxial curvature of the front surface, $k_2$ is a paraxial curvature of the rear surface, $p_1$ is a front surface aspheric coefficient, $p_2$ is a rear surface aspheric coefficient, A is a higher order coefficient, and x is a radial radius;

S2: establishing an evaluation function comprising an optimized value of astigmatism and an edge thickness of the lens; and S3: inputting a structural parameters of the lens blank and the prescription power to calculate $k_1$, $k_2$, optimizing one by one using the least square method according to the evaluation function to obtain $p_1$, $p_2$ and A.

2. The method, as recited in claim 1, wherein in the step of S2, the evaluation function comprises m objective functions $f_1, f_2 \ldots f_m$.

3. The method, as recited in claim 1, wherein in the step of S2, the evaluation function is $\emptyset(x) = \Sigma_{k=1}^{m}(f_k(x))\hat{\ }2$.

4. The method, as recited in claim 3, wherein m=5, $f_1$ is an astigmatism optimization within a lens center radius of 10 mm, and a target value is 0; $f_2$ is an astigmatism optimization within a lens center radius of 20 mm, and the target value is 0; $f_3$ is an astigmatism optimization within a lens center radius of 25 mm, and a target value is 0; $f_4$ is a power of a spherical lens within a radius of 5 mm, and a target value is consistent with a prescription power; $f_5$ is an edge thickness of the lens, and a target value is a value set by a user.

5. The method, as recited in claim 1, wherein in the step S3, the structural parameters of the lens blank comprises a lens diameter, a refractive index, a base curve, and a center thickness.

6. The method, as recited in claim 1, further comprising a step S4: processing a substrate according to structural parameters $k_1$, $k_2$, $p_1$, $p_2$ and A of a lens blank.

7. The method, as recited in claim 6, further comprising a step S5: hardening and filming the substrate.

8. A double-sided composite thinning zoom concave lens, comprising the substrate processed according to the method of the claim 1.

9. The double-sided composite thinning zoom concave lens, as recited in claim 8, wherein the substrate is performed with a step of hardening.

10. The double-sided composite thinning zoom concave lens, as recited in claim 8, wherein a surface of the substrate is coated with infrared optical coating.

* * * * *